US010954162B1

(12) United States Patent
Zubrod

(10) Patent No.: US 10,954,162 B1
(45) Date of Patent: Mar. 23, 2021

(54) PROTECTIVE COATING

(71) Applicant: Geopolymer Solutions, LLC, Delray Beach, FL (US)

(72) Inventor: Rodney Zubrod, Conroe, TX (US)

(73) Assignee: Geopolymer Solutions, LLC, Delray Beach, FL (US)

( * ) Notice: Subject to any disclaimer, the term of this patent is extended or adjusted under 35 U.S.C. 154(b) by 0 days.

(21) Appl. No.: 16/580,474

(22) Filed: Sep. 24, 2019

(51) Int. Cl.
| | | |
|---|---|---|
| C04B 28/08 | (2006.01) | |
| C04B 28/02 | (2006.01) | |
| C04B 14/04 | (2006.01) | |
| C04B 14/30 | (2006.01) | |
| C04B 22/00 | (2006.01) | |
| C04B 24/16 | (2006.01) | |
| C04B 24/38 | (2006.01) | |
| C04B 24/14 | (2006.01) | |
| C04B 111/28 | (2006.01) | |
| C04B 111/26 | (2006.01) | |
| C04B 111/00 | (2006.01) | |

(52) U.S. Cl.
CPC ............ *C04B 28/08* (2013.01); *C04B 14/045* (2013.01); *C04B 14/304* (2013.01); *C04B 22/0013* (2013.01); *C04B 24/14* (2013.01); *C04B 24/16* (2013.01); *C04B 24/383* (2013.01); *C04B 28/021* (2013.01); *C04B 2111/00155* (2013.01); *C04B 2111/00577* (2013.01); *C04B 2111/26* (2013.01); *C04B 2111/28* (2013.01)

(58) Field of Classification Search
CPC . C04B 14/045; C04B 14/304; C04B 22/0013; C04B 24/14; C04B 24/16; C04B 24/383; C04B 28/08; C04B 28/021; C04B 2111/26; C04B 2111/28; C04B 2111/00155; C04B 2111/00577
See application file for complete search history.

(56) References Cited

U.S. PATENT DOCUMENTS

| | | | |
|---|---|---|---|
| 1,537,939 | A | 5/1925 | Dunham |
| 3,303,142 | A | 2/1967 | Elden |
| 3,719,513 | A | 3/1973 | Bragg et al. |
| 3,839,059 | A | 10/1974 | Rothfelder et al. |
| 4,904,503 | A | 2/1990 | Hilton et al. |
| 5,352,288 | A | 10/1994 | Mallow |
| 5,401,538 | A | 3/1995 | Perito |
| 5,482,549 | A | 1/1996 | Blaakmeer et al. |
| 5,556,578 | A | 9/1996 | Berneburg et al. |
| 5,641,584 | A | 6/1997 | Andersen et al. |
| 5,718,759 | A | 2/1998 | Stav et al. |
| 6,162,288 | A | 12/2000 | Kindt et al. |
| 6,190,400 | B1 | 2/2001 | Van De Moer et al. |
| 6,740,157 | B2 | 5/2004 | Piniecki |
| 6,749,679 | B2 | 6/2004 | Shi |
| 7,727,327 | B2 | 6/2010 | Glessner et al. |
| 8,038,790 | B1 | 10/2011 | Dubey et al. |
| 8,167,998 | B2 | 5/2012 | Ladely (Guevara) et al. |
| 8,202,362 | B2 | 6/2012 | Davidovits et al. |
| 8,519,016 | B2 | 8/2013 | Perez-Pena |
| 8,574,358 | B2 | 11/2013 | Biscan et al. |
| 8,691,007 | B2 | 4/2014 | Samanta et al. |
| 8,722,772 | B2 | 5/2014 | Moussios et al. |
| 8,993,462 | B2 | 3/2015 | Duselis et al. |
| 9,670,096 | B1 | 6/2017 | Zubrod |
| 9,725,365 | B1 | 8/2017 | Zubrod |
| 9,932,269 | B2 | 4/2018 | Zubrod |
| 9,944,560 | B2 | 4/2018 | Zubrod |
| 10,196,310 | B2 | 2/2019 | Zubrod et al. |
| 2002/0157573 | A1 | 10/2002 | Pellett |
| 2005/0252420 | A1 | 11/2005 | Timmons |
| 2011/0132230 | A1 | 6/2011 | Han et al. |
| 2012/0037043 | A1 | 2/2012 | Zubrod |
| 2012/0276310 | A1 | 11/2012 | Andersen et al. |
| 2012/0286190 | A1 | 11/2012 | Prat et al. |
| 2014/0047999 | A1 | 2/2014 | Razl |
| 2014/0251186 | A1 | 9/2014 | Cross |
| 2014/0264140 | A1 | 9/2014 | Gong et al. |
| 2014/0360721 | A1 | 12/2014 | Getzlaf et al. |
| 2015/0107491 | A1 | 4/2015 | Ball et al. |
| 2015/0122154 | A1 | 5/2015 | Diaz-Loya et al. |
| 2015/0321954 | A1 | 11/2015 | Chalmers et al. |
| 2015/0343666 | A1 | 12/2015 | Huang |
| 2016/0068435 | A1* | 3/2016 | Daniels .................. C04B 14/16 264/133 |
| 2018/0037504 | A1 | 2/2018 | Zubrod |

(Continued)

FOREIGN PATENT DOCUMENTS

| | | |
|---|---|---|
| CN | 101525226 A | 9/2009 |
| CN | 101759383 A | 6/2010 |

(Continued)

OTHER PUBLICATIONS

International Search Report and Written Opinion, dated Nov. 20, 2017, for Application No. PCT/US2017/044681, filed on Jul. 31, 2017; consisting of 12-pages.
Notice of Allowance dated Feb. 3, 2017; for U.S. Appl. No. 15/228,829, filed Aug. 4, 2016; consisting of 19-pages.
Wu et al., "Geopolymer, green alkali activated cementitious material: Synthesis, application and challenges", 2019, Construction and Building Materials, vol. 224, pp. 930-949; consisting of 20-pages.

(Continued)

*Primary Examiner* — Anthony J Green

(74) *Attorney, Agent, or Firm* — Christopher & Weisberg. P.A.

(57) ABSTRACT

A cementitious protective coating material including a mixture of water, one or more of silicon dioxide/sodium silica pozzolans, anhydrous or hydrous sodium or potassium metasilicate; a rheology enhancing admixture; sodium tetraborate, sodium citrate dihydrate, citric acid, or boric acid; and a micro-fiber.

20 Claims, No Drawings

(56) References Cited

U.S. PATENT DOCUMENTS

| | | |
|---|---|---|
| 2018/0037505 A1 | 2/2018 | Zubrod et al. |
| 2018/0037506 A1 | 2/2018 | Zubrod |

FOREIGN PATENT DOCUMENTS

| | | | |
|---|---|---|---|
| CN | 102925019 A | | 2/2013 |
| CN | 104291740 A | | 1/2015 |
| CN | 104876633 A | | 9/2015 |
| CN | 108341640 A | * | 7/2018 |
| EP | 0217569 A2 | | 8/1987 |
| EP | 520413 B1 | | 12/1992 |
| EP | 0807614 B1 | | 4/2003 |
| EP | 2871169 A1 | | 5/2015 |
| WO | 9533698 | | 12/1995 |
| WO | 2004104816 A2 | | 12/2004 |
| WO | 2006070960 A1 | | 7/2006 |
| WO | 2006084670 A2 | | 8/2006 |
| WO | 2011085365 A1 | | 7/2011 |
| WO | 2012073258 A2 | | 6/2012 |
| WO | 2013048351 A1 | | 4/2013 |
| WO | 2013123181 A1 | | 8/2013 |
| WO | 2014176414 A1 | | 10/2014 |
| WO | 2015049010 A1 | | 4/2015 |
| WO | 2015062860 A1 | | 5/2015 |
| WO | 2015089611 A1 | | 6/2015 |
| WO | 2015144796 A1 | | 10/2015 |
| WO | 2015199291 A1 | | 12/2015 |
| WO | 2016016385 A1 | | 2/2016 |
| WO | 2016023073 A1 | | 2/2016 |
| WO | 2018026711 A1 | | 2/2018 |
| WO | 2018026714 A1 | | 2/2018 |
| WO | WO-2018026714 A1 * | 2/2018 | ........... C04B 22/062 |

OTHER PUBLICATIONS

International Search Report and Written Opinion dated Dec. 10, 2020, for corresponding International Application No. PCT/US2020/052404; consisting of 19-pages.

* cited by examiner

PROTECTIVE COATING

CROSS-REFERENCE TO RELATED APPLICATION n/a

FIELD

This invention relates to coating materials and methods for their manufacture, for protecting steel, wood, concrete, and other construction and industrial materials that require protection from corrosion. More particularly, the invention relates to coating materials and methods for their manufacture, that significantly reduce the generation of carbon dioxide and other green-house gases during production, unlike Portland Cement, typical Geopolymer cements, and coating materials that contain Volatile Organic Compounds (VOC's) and other noxious materials. Most particularly, this invention relates to use of a geopolymer type of coating material for corrosion protection, bonding, and heat resistance, respectively, which demonstrates dynamic characteristics which provide for elevated resistance to acid, chloride, alkali, water, and other corrosive liquids and solids; an elevated resistance to heat, elevated bond strength, and elevated long-term durability.

BACKGROUND

Corrosion resistant paint and/or coating is not a new concept. For example, it is well known to apply various liquid paints and coatings to structural members and other building surfaces in order to reduce the corrosion resulting from precipitation events and humidity, salts (chlorides), alkali's, and acids exposed thereto. While geopolymer types of cement have been studied extensively, and it has been concluded that heat resistance, corrosion resistance, and durability is typically relatively high when compared to Portland cement, the challenges in using a geopolymer type of cement in a thin corrosion resistant coating mixture were both problematic and arduous. Recipe's exist for various cold fusion concrete and geopolymer types of mixtures, but the concentrations of necessary materials are dramatically different for a thin coating material.

SUMMARY

The present invention is directed towards materials, and methods for producing a mechanical or hand applied, corrosion resistant coating.

The formulation of the present disclosure reduces the generation of carbon dioxide and other green-house gases during production, unlike Portland Cement, typical Geopolymer cements, and typical corrosion resistant coatings and paints that contain Volatile Organic Compounds (VOC's), solvents, and other noxious chemicals that are deleterious to the environment to produce.

A challenge in developing the formulation was to overcome liquid material sloughing and sagging during and after application, in a liquid state. This was accomplished by adding rheology adjusting minerals and chemicals that installed a thixotropic characteristic while maintaining pumpable fluidity and a small particle size.

A challenge in developing the formulation consisted of disconnecting from industry design methodologies for geopolymer's and Portland mixtures that includes lightweight filler materials or normal/heavy weight aggregate design protocol. Alterations in the design approach including volume change, acid resistance, and durability were required to produce a mixture that could be applied in thicknesses of from about 0.1 mil to about 1 mil, verses about 10 mil to 300 mil thicknesses typically produced with standard concrete mixtures.

Another challenge was maintaining an elevated glass to water ratio for corrosion protection and acid resistance, while maintaining sufficient fluidity for pumping and spraying purposes. This was accomplished by adding and balancing the metasilicate and pozzolan material, while maintaining a balanced inherent calcium hydroxide content (inherent to pozzolan) for the development of calcium silicate hydrate, with low to no material shrinkage.

Another challenge was adjusting the time of set to achieve about an hour of cohesive state. This was accomplished by balancing the water, thixotropic additives, and glass to achieve about an hour of workability.

Cold fusion concrete formulations utilize glassy activators that mobilize and digest other inherent glassy materials, and polymerizes water into glass and metallic oxides, hydroxides, and hydrates.

While all of the measures utilized to overcome the challenges are applicable, one or more of the measures are selected based upon the field application, and the application method in the event no spray apparatus is utilized. Accordingly, it is an objective of the instant invention to provide a corrosion resistant coating, which is applied by spray, brush, or roller including a mixture of water, acting as a lubricant and activator; anhydrous or hydrous sodium or potassium metasilicate acting as an activator; waste or manmade pozzolanic materials acting as a cementitious ingredient; other elevated glass content minerals acting as a cementitious ingredient; sodium tetraborate, sodium citrate dihydrate, citric acid, or boric acid acting as set-time retarders; a rheology enhancement additive derived from polymers or co-polymers; and, a micro-fiber to improve rheology and increase strength.

In some cases, where volume change and rheology efforts are extra-ordinarily problematic, a protein or synthetic protein material achieving the same characteristics as protein that is able to form a weak covalent bond with the hydroxides and silicates, therein altering the ion concentration of the hydroxides and silicates for the purpose of retaining water, maintaining a consistent volume during the curing process, and to reduce the sticky/tacky characteristic of silicates is utilized. Concentrations of the protein may vary from between about 0.05% (wt/wt) and about 2.5% (wt/wt) of the cementitious mass.

In some cases where volume change resulting from plastic, drying, or autogenous shrinkage is deleterious, adding sulfonated formaldehyde as a water reducing material, and magnesium oxide as a shrinkage control device is helpful. Both materials can be added to the mixture at a rate of about 0.05% (wt/wt) to 5% (wt/wt).

DETAILED DESCRIPTION

Definitions

As used herein, the term "Portland Cement" refers to any cement referred to by the terms Ordinary Portland Cement (OPC), Portland, Blended Hydraulic Cement, Simple Cement, Blended Pozzolan Cement, Pozzolan Cement, or other industry characterizations or jargon descriptions where the material may be used to bind a composition of mineral aggregates, lightweight aggregates, synthetic aggregates, or no aggregates, water, and chemicals into a mass that hardens and is used in structures or features that may or may not be governed by codes including the International Code Council (ICC), the American Association of State Highway and Transportation Officials (AASHTO), The American Society for Testing and Materials (ASTM), The American Concrete Institute (ACI), or similar International Transportation, Building, or Maintenance Agency. Portland Cement includes modified materials including those blended with Fly Ash and other Pozzolans, high calcium content cements, non-sulfate containing cements, sulfate resistant cements, high-early strength cements, and air-entrained cements.

As used herein, the term "Geopolymer Cement" is an industry term characterizing silicon dioxide, sodium silica, and aluminum bearing pozzolans that are activated and bound by alkali's, alkali salts, alkali hydroxides, and oxides, that form a hardened material used in the transportation, building industry, and as a specialty chemical and/or heat resistant concrete. Geopolymer Cements may or may not contain Portland.

As used herein, the term "Cementitious Materials" refers to a fine grained material, which has cementing value when used in concrete either by themselves, such as Portland cement, blended hydraulic cements, and expansive cement, or such materials in combination with fly ash, other raw or calcined natural pozzolans, silica fume, fumed silica, diatomite, zeolites, kaolin, attapulgite, red clay, and/or ground granulated blast-furnace slag.

As used herein, the term "Fumed Silica" refers to a man-made fine-grained material, consisting of a minimum 90% silicon dioxide. Other fine grained silicon dioxide bearing materials may be substituted such as fine grained mineral clays, silica fume, ground glass, silicon gel, or other similar materials.

As used herein, the term "Fly Ash" (Class C or Class F) material refers to a coal combustion by-product from power generation that may or may not be classified under the Standard ASTM C618 Specification. Fly ash is the finer product from coal combustion that is collected from the flu-gas stream by electrostatic precipitators and/or baghouses and used in Geopolymer, Portland, and Cold Fusion cements and concrete as a cementitious material and mitigation of alkali-silica reaction. Fly ash may be replaced in whole or in part with silica fume, which is a coal combustion by-product obtained from the flu gas stream, or classified fly ash. Classified fly ash for the purpose intended herein, is a standard Class C or Class F Fly Ash where finer or coarser particles have been separated and either the finer or coarser portion utilized.

As used herein, the term Granulated Ground Blast Furnace Slag (GGBFS) is a by-product obtained during the production (quenching) of metal products and objects including iron, copper, brass, and others. GGBFS typically contains elevated concentrations of silicon dioxide, aluminium, calcium, and other reactive products that when mixed in Geopolymer, Portland, or Cold Fusion cement and concrete, aids in the development of strength and mitigates alkali-silica reaction.

As used herein, the term "Set Time Retarders" refers to any dry or liquid admixture added to Portland, Geopolymer, or Cold Fusion cements and concretes to retard the time of setting, and to provide more work-ability time during construction and maintenance efforts of various features. The following are illustrative, albeit non-limiting examples of compounds useful as either set time retarders, and/or activation and rheology enhancers:

(1) Sodium tetraborate also known as borax, sodium borate, or disodium tetraborate, is a boron compound, a mineral, and a salt of boric acid. Powdered sodium tetraborate/borax is white, and contains soft colorless crystals that dissolve easily in water. Sodium tetraborate is many times used as a set time retarder, activation and rheology enhancer for Geopolymers and Cold Fusion types of cement and concrete.

(2) When Portland Cement is used, typical surfactant, lignant, Portland industry set time retarders, rheology modifiers, and water reducers may be used such as those purchased from SIKA, BASF Construction Chemicals, W.R. Grace, Euclid, and other suppliers.

(3) Sodium citrate dihydrate has the chemical formula of $Na_3C_6H_5O_7$. It is sometimes referred to simply as sodium citrate, though sodium citrate can refer to any of the three sodium salts of citric acid. Sodium citrate dihydrate is many times used as a set time retarder, activation and rheology enhancer for Geopolymers and Cold Fusion types of cement and concrete.

(4) Citric acid is a weak organic tribasic acid having the chemical formula $C_6H_8O_7$. It occurs naturally in citrus fruits. In biochemistry, it is an intermediate in the citric acid cycle, which occurs in the metabolism of all aerobic organisms. Citric acid is often times used as a set time retarder, for Geopolymers and Cold Fusion types of cement and concrete.

(5) Boric acid, also called hydrogen borate, boracic acid, orthoboric acid and acidum boricum, is a weak, monobasic Lewis acid of boron often used as an antiseptic, insecticide, flame retardant, neutron absorber, or precursor to other chemical compounds. It has the chemical formula $H_3BO_3$ (sometimes written $B(OH)_3$), and exists in the form of colorless crystals or a white powder that dissolves in water. When occurring as a mineral, it is called sassolite. Boric acid is often useful as a set time retarder for Geopolymers and Cold Fusion types of cement and concrete.

As used herein, the term "High Alumino Silicate Containing Clay" refers to any naturally occurring mineral material useful in Portland and Geopolymer cements and concrete such as Kaolin, Red, and Attapulgite clays that have an organic content of less than 2% (wt/wt), but an elevated silicon dioxide content of at least 40% (wt/wt) and an aluminium content at least 10% (wt/t). Other naturally occurring minerals may be used as replacements including zeolites, diatomaceous earth, volcanic minerals, and other similar materials.

As used herein, the term "Protein" or "Synthetic Protein Material" refers to large biomolecules, or macromolecules, inclusive of one or more long chains of amino acid residues. For the protein to be useful in Geopolymer or Cold Fusion types of cements or concrete, the DNA chain produces a covalent bond between the mixture silicates and produced hydroxides, therein temporarily adjusting the ionic concentration (up or down) and reducing and/or removing the sticky and tacky characteristic inherent in most Geopolymer types of cement, and reducing mixture volume change from a higher quality restructuring of the ions during reformation after the protein effect has terminated due to a pH reduction, temperature elevation, or time.

As used herein, the term "Shrinkage Control Device" refers to manmade or naturally occurring minerals or admixtures that produce a controlled volume swell in the mixture intended to reduce or remove plastic, drying, or autogenous shrinkage in the mixture. These may include materials such as metallic oxides and hydroxides such as magnesium, calcium, potassium, aluminum, and sodium, as well as metallic sulfates and sulfides such as magnesium, calcium, potassium, aluminum, and sodium.

As used herein, the term "Water Reducing Admixture" may include natural or manmade materials specifically utilized to reduce the water demand of cementitious mixtures through lubrication, electro-static repulsion, or other means. These materials may include but not limited to sulfonated formaldehyde, as well as industry dry water reducing additives such as those supplied by Euclid, WR Grace, and Sika.

As used herein, the term "Fibers" refers to manmade micro (thin denier), or deformed fibers produced commercially for the specific purpose of adjusting coating material rheology, removing or reducing cracking in coatings, adjusting modulus characteristics, and improving strength. Fibers are typically formed from glass, basalt, nylon, polystyrene, cellulose, and ceramic of variable denier, length, and shape.

As used herein, the term "Rheology Adjustment Admixture" refers to various manmade polymers and co-polymers designed to thicken coating materials or install thixotropic properties to same exampled but not limited to by:
1) Vinyl acetate
2) Polyvinyl alcohol
3) Carboxymethylcellulose
4) Cellullose
5) Methyl Ethyl Hydroxyethyl Cellulose
6) Talc The term "about" or "approximately" as used herein means within an acceptable error range for the particular value as determined by one of ordinary skill in the art, which will depend in part on how the value is measured or determined, i.e., the limitations of the measurement system. Where particular values are described in the application and claims, unless otherwise stated, the term "about" means within an acceptable error range for the particular value.

Unless otherwise indicated, all material requirements are expressed as wt/wt %, understood to be the mass of a particular constituent over the mass of the entire mixture, as indicated, inclusive of water×100%.

The present invention is directed to a spray, roller, or brush applied protective corrosion inhibitor coating, particularly to the constituent materials contained therein, and to methods for producing the coating for use in the construction and maintenance industries. The product of the instant invention is useful for protecting steel, wood, concrete, and other construction and industrial materials that require protection from corrosion, whether the corrosion is caused by caustic or acidic chemical attack, humidity, chlorides, or other natural or manmade exposures.

One use for the materials and methods disclosed herein is to provide industries, such as the construction industry, with a product that significantly reduces the generation of carbon dioxide and other green-house gases during production, unlike other coatings that contain deleterious (to the environment) materials. Further, another advantage of the invention is that it utilizes basic processes and materials that may be incorporated into existing production facilities and methodologies. A further use is to increase the quality of the product by reducing damage to constructed features from, for example, exposures to climatic conditions (such as extreme or variable weather), extreme heat, damaging chemicals such as chlorides, sulfates, acids, or the like, or impact damage to the coating from shipping or construction efforts.

It is noted that typical coatings that contain VOC's, solvents, and other unstable materials may burn and otherwise dissipate in high temperature conditions as low as 250° F., such as those introduced during fire events; whereas the present invention may maintain integrity up to a temperature of about 1,200° F.

The present invention is directed to a material which includes a mixture of water, acting as a lubricant and activator; anhydrous or hydrous sodium or potassium metasilicate or pentahydrate acting as an activator; fine grained cementitious materials such as Portland Cement, Granulated Ground Blast Furnace Slag (GGBFS), high calcium or low calcium waste from coal combustion (Class C or Class F), ground waste glass, kaolin clay, red clay, attapulgite clay, zeolites, diatomite, and other natural and manmade pozzolanic materials acting as a cementitious ingredient; sodium tetraborate, sodium citrate dihydrate, citric acid, or boric acid acting as set-time retarders; and, a rheology modifier consisting of one or more of vinyl acetate, carboxymethylcellulose, cellulose (and derivatives), talc, purified attapulgite, polyvinyl alcohol, vinyl versatate, alkyloxysilane, or other similar additive, or, micro fibers consisting of polyethylene, cellulose, wood, aramid, kayocel, nylon, wollastonite, basalt, or glass to improve rheology and increase strength.

Design methodologies relative to mixture glass contents and types may vary. When water is introduced to sodium or potassium metasilicate, or, sodium or pottasium metasilicate pentahydrate, an elevated pH and heat are produced. During the first approximate 120 second exothermic period, glassy components installed directly and those in the pozzolan materials may partially digest within the liquid. These glassy components while contributing largely to a reduction in water and air permeability and chemical resistance, also contribute to strength and long-term durability as a pozzolan component partially polymerizing into calcium silicate hydrate as calcium hydroxide that is inherent to some of the pozzolans is liberated through water mixing. The glass content may be balanced due to its sticky and tacky characteristic to achieve pump-ability and a stable rheology that resists sloughing and sagging when sprayed, brushed, or roller applied, while maintaining a low air and water permeability, a high resistance to chemical exposure degradation, and low volume expansion and contraction relative to plastic, drying, and autogenous shrinkage, and thermal expansion and contraction. Cementitious and pozzolan materials many times contain metallic alkali hydroxide components that are not highly resistive to low pH chemical attack. The metallic alkali hydroxide when liberated through contact with water or low pH mixing condition, may be absorbed by the sodium or potassium metasilicate, or sodium or potassium metasilicate pentahydrate and converted into a metalic silicate hydrate. The efficacy of the conversion may require testing in acid solutions to ensure little to no free metallic alkali hydroxides are available in the mixture that may react with a low pH chemical.

Sodium and/or potassium silicates inherently attach chemically to metallic substrates. The attachment is enhanced through the use of tetraborate, which acts as a penetration enhancement and workability time control device. Balancing mixture constituents is important to ensure the additions of rheology enhancement and water do not impede, dilute, or otherwise reduce the bond of the silicates. The bond is important to ensure the variable thermal expansion and contraction of the coating and the underlying substrate maintains a durable and consistent layer.

Rheology enhancement is an important aspect for a consistent and thorough layer application, whether brush, roller, or spray applied. Using rheology enhancement chemicals or minerals such as vinyl acetate, carboxymethylcellulose, cellulose (and derivatives), talc, purified attapulgite, fumed silica, polyvinyl alcohol, vinyl versatate, alkyloxysilane, or other similar additives are designed to achieve thixotropic characteristics where when the material is in liquid form, the liquid is stable, unless moved, and sloughing and sagging is reduced to a minimum. Selecting one or two rheology adjusting chemicals and/or minerals is advantageous and using more than two risks waste and chemical conflicts. Many times, using one or two rheology adjusting minerals and/or chemicals combined with a small denier and short micro fiber consisting of one or more of polyethylene, cellulose, wood, aramid, kayocel, nylon, wollastonite, basalt, or glass, with denier and length ranging from 0.05 to 5 microns is useful.

Reducing the water demand of the mixture, and/or installing a volume expansion device is sometimes an important remedy for plastic, drying, and/or autogenous shrinkage control. The expansion devices available for use include metallic oxides and hydroxides such as magnesium, calcium, potassium, aluminum, and sodium, as well as metallic sulfates and sulfides such as magnesium, calcium, potassium, aluminum, and sodium. Oxides, hydroxides, sulfates, and sulfides are added at a rate of between 0.05% (wt/wt) and 5% (wt/wt). Sulfonated formaldehyde is an effective water reducer added at a rate of from 0.05% (wt/wt) and 5% (wt/wt), as well as industry dry water reducing additives such as those supplied by Euclid, WR Grace, and Sika, added at the manufacturers recommended dosage.

The water may be potable. Mixture constituent balancing may be necessary due to variable water sources with varying pH, mineral content, fluoride, and other chemicals and ingredients. The amount of water should be determined by trial batch tests targeted at obtaining the desired characteristics for the specific application.

The sodium or potassium metasilicate/pentahydrate concentrations are selected based upon other materials, primarily the cementitious materials. The concentration of metasilicate/pentahydrate is generally between about 7% (wt/wt) and 45% (wt/wt) of the cementitious materials in order to achieve prescribed strength, bond strength, and chemical resistance. In events where the application is in an industrial area subject to an airborne acidic particulate, higher concentrations of metasilicate are desired to increase the layers of silicon dioxide and sodium silica content and relative resistance to acid attack. In industrial applications subject to acids, the mixture may be resistant to all acid concentrations except for hydrofluoric acid.

Either GGBFS, fly ash, or other high silicon dioxide/sodium silica bearing materials (pozzolans) is used at percentages ranging up to about 75% (wt/wt). Should the addition of desirable amounts of GGBFS or fly ash not achieve the intended chemical resistance or reduced permeability, high silicon dioxide/sodium silica (glass) bearing materials such as clays, fumed silica, silica fume, diatomite, zeolites, attapulgite, or other mineral materials may be added to augment or replace to about 1% (wt/wt) to about 75% (wt/wt) to achieve desired characteristics. Typically, the overall range falls within about 5% (wt/wt) to about 75% (wt/wt), with any one component comprising from about 1% to 75% (wt/wt). The amount of any materials is dependent upon inherent characteristics including the calcium content, the aluminum content, the carbon content (loss on ignition), and the silicon/silica content. Using a mixture of two, three, or more cementitious materials is advantageous for production purposes in order to reduce the variability effect of one of the materials, should variability incorporate. Both GGBFS and fly ash materials are the product and waste from burning industrial materials at high temperatures and accordingly, both materials have a relative high resistance to heat. Naturally occurring pozzolan materials such as Kaolin clay, attapulgite clay, zeolites, diatomite, red clay, and other natural or manmade minerals can be utilized; the materials should have elevated (above 50%) silicon dioxide content. Trials are necessary to determine the concentration of each material, but a total cementitious amount of between 600 and 2500 pounds per cubic yard is effective.

The set-time retarding materials should be selected based upon the effectiveness of the material in the constituent combination utilized. Generally, if 1-hour of set time is achieved using the most economical material and relative concentration; this is satisfactory to allow reapplication of the layer if necessary, for multi-lift applications.

Micro fibers can be an important ingredient to reduce cracking of the finished layer as a result of evaporation and autogenous volume change from material polymerization. Any small denier and short micro fiber can be selected but the fiber should be small enough to pass through orifices of spray nozzles. Trials are necessary to determine the concentration of fibers but generally from about 0.5 (wt/wt) to about 25% (wt/wt) are typically effective.

In some cases, where unit weight and volume change efforts are extra-ordinarily problematic, a protein, or a synthetic protein material capable of achieving the same characteristics as a protein, which is capable of forming a weak covalent bond with the hydroxides and silicates, therein altering the ion concentration of the hydroxides and silicates for the purpose of retaining water, maintaining a consistent volume during the curing process, and to reduce the sticky/tacky characteristic of silicates, is utilized. Concentrations of the protein may vary from between about 0.05% (wt/wt) and about 5.0% (wt/wt) of the mass of all ingredients.

EXAMPLES

In order to produce a spray, roller, or brush applied, corrosion resistant cold fusion concrete coating that is resistant to the climate variability, water, acids, sulfates, chlorides, and brief heat exposure up to 1,600° F., dry materials should be combined, water added, and mixing should progress for a minimum of 4 minutes and a maximum of 10 minutes.

The cementitious materials should include at least one of fly ash (Class C or Class F), Granulated Ground Blast Furnace Slag (GGBFS), clay, fumed silica, silica fume, diatomite, zeolites, attapulgite, or kaolin. The cementitious material should be added in variable concentrations dependent upon mixture strength, volume change, carbonation, and rheological behavior to mass concentrations ranging from a combined total of about 1% (wt/wt) to about 75% (wt/wt). The cementitious material concentrations of the mixture should be selected by balancing mass and volume amounts in mixture designs until characteristics are as specified by project requirements.

The cementitious materials should include sodium or potassium metasilicate, or sodium or potassium metasilicate pentahydrate, added in variable concentrations dependent upon mixture strength, volume change, carbonation, and rheological behavior to mass concentrations ranging from about 7% (wt/wt) to about 45% (wt/wt). The concentration of sodium or potassium metasilicate or pentahydrate in the mixture should be selected by balancing the mass and volume amounts in mixture designs until characteristics comply with project requirements. During events where mixing times are very short such as continuous mixing applications, elevating the pentahydrate content is many times beneficial to ensure complete incorporation of silicate materials.

The cementitious materials may include sodium tetraborate, sodium citrate dihydrate, or, citric, boric, or silicic acid, added in variable concentrations ranging from about 0.0% (wt/wt) to about 15.0% (wt/wt) by mass of the mixture including water, to extend the time of set and/or working time.

Protein is added as a portion of the cementitious material in concentrations ranging from about 0.05% (wt/wt) to about 5% (wt/wt), with the proviso that protein is provided at the minimum concentration which may produce a covalent bond between mixture silicates and produced hydroxides therein temporarily reducing the mixture sticky/tacky characteristic and reducing mixture volume change.

The cementitious materials may include a micro-fiber derived from polyethylene, cellulose, wood, aramid, kayocel, nylon, wollastonite, basalt, or glass to improve rheology and increase strength, with typical additions from about 1% (wt/wt) to 25% (wt/wt).

The cementitious materials may include a rheology modifier consisting of one or more of vinyl acetate, carboxymethylcellulose, cellulose (and derivatives), talc, purified attapulgite, polyvinyl alcohol, vinyl versatate, alkyloxysilane, or other similar additive with typical additions from about 0.2% (wt/wt) to 2% (wt/wt).

Sulfonated formaldehyde or typical industry dry water reducing chemicals are added at from 0.05% (wt/wt) to 5% (wt/wt), or the manufacturers recommendation, respectively.

Water is added to the mixture in mass amounts ranging from about 7% (wt/wt) to about 35% (wt/wt), such that the concentration of water is effective to produce consistencies and other characteristics that comply with project requirements for the intended purpose ranging from a brush or roller applied vertical, horizontal or overhead coating, to spray applied vertical, overhead, or horizontal coating materials for various structural items including metal, concrete, and wood.

When all constituents are combined, the material should be mixed for from 10 seconds to 4 minutes prior to application. After application, curing in any convenient ambient environment with temperatures ranging from about 20° F. to 140° F. may occur until specified strength is achieved, or the curing may be expedited by elevating the temperature around the material to from about 95° F. to about 180° F.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A spray, roller, or brush applied corrosion inhibitor coating composition, comprising:
   from about 25% to 75% (wt/wt) of equal portions of GGBFS and fly ash;
   from 7% to 45% (wt/wt) sodium metasilicate;
   from 0.05% to 5% (wt/wt) of magnesium oxide;
   from 1% to 15% (wt/wt) sodium tetraborate;
   from 0.05% to 5% (wt/wt) protein;
   from 7% to 35% (wt/wt) water; and
   from 0.2% to 2% (wt/wt) of at least one selected from the group consisting of cellulose, carboxymethylcellulose, polyvinyl alcohol, talc, vinyl acetate, vinyl versatate, and methyl ethyl hydroxyethyl cellulose.

2. The coating composition of claim 1, further including:
   from 1% to 50% (wt/wt) of at least one selected from the group consisting of zeolite, diatomite, silica fume, fumed silica, attapulgite clay, kaolin clay, Portland, and red clay.

3. The coating composition of claim 1, further including:
   from 1% to 25% (wt/wt) microfiber of at least one selected from the group consisting of polyethylene, cellulose, aramid, nylon, wollastonite, basalt, and glass.

4. The coating composition of claim 1, wherein the coating is water adjustable to a consistency capable of being applied by at least one selected from the group consisting of spraying, brushing, and rolling.

5. A spray, roller, or brush applied corrosion inhibitor coating composition, comprising:
   from about 25% to 75% (wt/wt) of GGBFS;
   from 7% to 45% (wt/wt) sodium metasilicate;
   from 0% to 15% (wt/wt) of boric acid;
   from 1% to 25% (wt/wt) of Wollastonite microfibers;
   from 0.2% to 2% carboxymethylcellulose;
   from 0.05% to 5% (wt/wt) protein;
   from 0.05% to 5% (wt/wt) sulfonated formaldehyde; and
   from 7% to 35% (wt/wt) water.

6. The coating composition of claim 5, further including from 0.05% to 5% (wt/wt) calcium sulfate.

7. The coating composition of claim 5, further including from 1% to 50% (wt/wt) kaolin clay.

8. A spray, roller, or brush applied corrosion inhibitor coating composition, comprising:
   from about 25% to 75% (wt/wt) of fumed silica;
   from 7% to 45% (wt/wt) sodium metasilicate;
   from 1% to 15% (wt/wt) sodium tetraborate;
   from 0.05% to 5% (wt/wt) magnesium oxide;
   from 0.05% to 5% (wt/wt) sulfonated formaldehyde; and
   from 7% to 35% (wt/wt) water.

9. The coating composition of claim 8, further including from 25% to 75% (wt/wt) of Portland cement.

10. The coating composition of claim 8, further including 0.5% to 25% (wt/wt) glass micro-fibers.

11. A spray, roller, or brush applied corrosion inhibitor coating composition, comprising:
   from about 25% to 75% (wt/wt) of red clay;
   from 7% to 45% (wt/wt) potassium metasilicate;

from 1% to 15% (wt/wt) citric acid;
from 0.2% to 2% (wt/wt) vinyl acetate;
from 0.05% to 5% protein; and
from 7% to 35% (wt/wt) water.

12. The coating composition of claim 11, further including 1% to 25% (wt/wt) basalt micro-fibers.

13. The coating composition of claim 11, further including from 7% to 45% (wt/wt) potassium metasilicate pentahydrate.

14. The coating composition of claim 11, further including from 25% to 75% (wt/wt) kaolin clay.

15. The coating composition of claim 11, further including from 0.2% to 2% (wt/wt) vinyl versatate.

16. A spray, roller, or brush applied corrosion inhibitor coating composition, comprising:
from about 25% to 75% (wt/wt) of silica fume;
from 7% to 45% (wt/wt) sodium metasilicate;
from 1% to 15% (wt/wt) of sodium tetraborate;
from 1% to 25% nylon microfibers;
from 0.2% to 2% carboxymethylcellulose;
from 0.05% to 5% (wt/wt) protein;
from 0.05% to 5% (wt/wt) sulfonated formaldehyde; and
from 7% to 35% (wt/wt) water.

17. The coating composition of claim 16, further including from 1% to 25% attapulgite clay.

18. The coating composition of claim 16, further including from 1% to 25% zeolite.

19. The coating composition of claim 16, further including from 0.2% to 2% (wt/wt) polyvinyl alcohol.

20. The coating composition of claim 16, further including from 0.05% to 5% (wt/wt) magnesium oxide.

\* \* \* \* \*